United States Patent
Stahlfeld et al.

(10) Patent No.: US 12,056,798 B2
(45) Date of Patent: Aug. 6, 2024

(54) FILLING GAPS IN ELECTRIC GRID MODELS

(71) Applicant: X Development LLC, Mountain View, CA (US)

(72) Inventors: Phillip Ellsworth Stahlfeld, Mountain View, CA (US); Ananya Gupta, San Francisco, CA (US)

(73) Assignee: X Development LLC, Mountain View, CA (US)

(*) Notice: Subject to any disclaimer, the term of this patent is extended or adjusted under 35 U.S.C. 154(b) by 60 days.

(21) Appl. No.: 17/718,840

(22) Filed: Apr. 12, 2022

(65) Prior Publication Data

US 2022/0335669 A1  Oct. 20, 2022

Related U.S. Application Data

(60) Provisional application No. 63/175,701, filed on Apr. 16, 2021.

(51) Int. Cl.
G06T 11/20 (2006.01)
G06V 10/82 (2022.01)
G06V 20/10 (2022.01)
G06V 20/17 (2022.01)

(52) U.S. Cl.
CPC ............ G06T 11/203 (2013.01); G06V 10/82 (2022.01); G06V 20/17 (2022.01); G06V 20/176 (2022.01); *G06V 20/182* (2022.01); *G06V 20/194* (2022.01)

(58) Field of Classification Search
None
See application file for complete search history.

(56) References Cited

U.S. PATENT DOCUMENTS

| | | |
|---|---|---|
| 8,340,360 B2 | 12/2012 | Chen et al. |
| 9,262,852 B1 | 2/2016 | Kehl et al. |
| 10,444,806 B2 | 10/2019 | Brockman et al. |
| 2006/0262876 A1 | 11/2006 | LaDue |

(Continued)

FOREIGN PATENT DOCUMENTS

| | | |
|---|---|---|
| WO | WO 2017/100916 | 6/2017 |
| WO | WO 2019/053588 | 3/2019 |

OTHER PUBLICATIONS

International Search Report and Written Opinion in International Appln. No. PCT/US2022/023818, dated Jul. 29, 2022, 15 pages.

(Continued)

*Primary Examiner* — Robert J Craddock
(74) *Attorney, Agent, or Firm* — Fish & Richardson P.C.

(57) ABSTRACT

Methods, systems, and apparatus, including computer programs encoded on a storage device, for filling gaps in electric grid models are enclosed. A method includes obtaining vector data representing first portions of paths of electric grid wires over a geographic region; converting the vector data to first raster image data that depicts an overhead view of the electric grid wires including a first set of line segments representing the first portions of the paths; processing the first raster image data using a gap filling model; obtaining, as output from the gap filling model, second raster image data including a second set of line segments corresponding to gaps included in the input raster image data and representing second portions of paths of the electric grid wires; and converting the second raster image data to vector data representing the first portions and the second portions of paths of the electric grid wires.

20 Claims, 6 Drawing Sheets

(56) References Cited

U.S. PATENT DOCUMENTS

2012/0089384 A1    4/2012   Coyne et al.
2013/0166270 A1    6/2013   Sun et al.
2017/0092055 A1    3/2017   Brockman et al.
2019/0147296 A1    5/2019   Wang et al.
2020/0034638 A1    1/2020   Brewington et al.
2020/0043285 A1    2/2020   Brockman et al.

OTHER PUBLICATIONS

Sasaki et al., "Learning to restore deteriorated line drawing," The Visual Computer, May 2018, 34(6):1077-1085.
Zhang et al., "Automatic Power Line Inspection Using UAV Images," Remote Sens., Aug. 2017, 9(8):824.
International Preliminary Report on Patentability in International Appln. No. PCT/US2022/023818, dated Oct. 26, 2023, 9 pages.

```
┌─────────────────────────────────────────────────────────────┐
│  OBTAINING VECTOR DATA REPRESENTING FIRST PORTIONS OF PATHS │
│  OF ELECTRIC GRID WIRES OVER A GEOGRAPHIC REGION       302  │
└─────────────────────────────────────────────────────────────┘
                              ↓
┌─────────────────────────────────────────────────────────────┐
│  CONVERTING THE VECTOR DATA TO FIRST RASTER IMAGE DATA      │
│  DEPICTING AN OVERHEAD VIEW OF THE ELECTRIC GRID WIRES  304 │
└─────────────────────────────────────────────────────────────┘
                              ↓
┌─────────────────────────────────────────────────────────────┐
│  PROCESSING THE FIRST RASTER IMAGE DATA USING A GAP FILLING │
│  MODEL THAT IS CONFIGURED TO FILL GAPS IN RASTER IMAGES     │
│                                                         306 │
└─────────────────────────────────────────────────────────────┘
                              ↓
┌─────────────────────────────────────────────────────────────┐
│  OBTAINING, AS OUTPUT FROM THE GAP FILLING MODEL, SECOND    │
│  RASTER IMAGE DATA DEPICTING AN UPDATED OVERHEAD VIEW OF THE│
│  ELECTRIC GRID WIRES INCLUDING REPRESENTATIONS OF THE FIRST │
│  PORTIONS OF THE PATHS AND OF SECOND PORTIONS OF THE PATHS  │
│  CORRESPONDING TO GAPS IN THE FIRST RASTER IMAGE DATA   308 │
└─────────────────────────────────────────────────────────────┘
                              ↓
┌─────────────────────────────────────────────────────────────┐
│  CONVERTING THE SECOND RASTER IMAGE DATA TO VECTOR DATA     │
│  REPRESENTING THE FIRST PORTIONS AND THE SECOND PORTIONS OF │
│  PATHS OF THE ELECTRIC GRID WIRES                       310 │
└─────────────────────────────────────────────────────────────┘
```

FILLING GAPS IN ELECTRIC GRID MODELS

CROSS-REFERENCE TO RELATED APPLICATION

This application claims the benefit of U.S. Provisional Patent Application No. 63/175,701, filed Apr. 16, 2021, the contents of which are incorporated by reference herein.

TECHNICAL FIELD

The present specification relates to electrical power grids, and specifically to generating models of electrical power grids.

BACKGROUND

Electrical power grids transmit electrical power to loads such as residential and commercial buildings. Various electrical power grid conditions can be simulated and visualized using electrical power grid models. Electric grid models are used to evaluate and predict operations and potential faults in an electric grid. However, present approaches for modeling electric grids generate inaccurate predictions of the locations of important electric grid components such as feeder lines. Feeder lines are typically mapped using vector data that identifies geographic coordinates of starting points and end points of each line.

SUMMARY

In general, the present disclosure relates to a system for accurately modeling electric power grids. Electric grid models are used to evaluate and predict operations and potential faults in an electric grid. Electric grid models can include mappings of electric grid wires between power sources and loads, e.g., maps of utility poles and electric grid wires that extend between utility poles. The present disclosure provides a system and method to accurately map paths of electric wires of an electric power grid. The disclosed methods can be used to train a gap-filling model to accurately fill in gaps in overhead images of electric grid wires. The trained gap-filling model can process an incomplete or obscured overhead image of grid wires, and output a more complete overhead view of the grid wires for use in electric grid modeling and simulation.

A gap-filling model can be trained using a set of ground truth images that depict overhead views of electric grid wires. The ground truth images can include line segments that represent paths of electric grid wires over a geographic region. A set of modified images can be generated by removing portions of the line segments from each image in the set of ground truth images. For example, a random selection of between ten and fifty percent of line segments may be removed from the images. Due to removing the portions of the line segments, the modified images include gaps between line segments.

A gap filling model can receive the modified images as input and generate corresponding output images. The output images can include line segments that fill in gaps that were created by removing the portions of the line segments. The output images can then be compared to the ground truth images. Parameters of the gap-filling model can be adjusted based on comparing the output images to the ground truth images. Thus, the gap-filling model can be trained to fill in gaps of partial maps of the electric grid. The gap-filling model can be, for example, a machine learning model such as an autoencoder model. In some examples, additional channels of raster data can provide additional context that can be used to train the gap-filling model. Additional channels can represent, e.g., topological features, property boundaries, transportation routes, etc. of a geographic area.

A trained gap-filling model can be used for inference to fill gaps in incomplete maps of electric grid wires. The trained gap-filling model can receive, as input, raster image data that depicts at least a partial overhead view of electric grid wires. The raster image data can include line segments that represent paths of the electric grid wires over a geographic region. In some examples, each pixel of the raster image data is designated as representing a grid wire, or as not representing a grid wire.

The raster image data can include gaps in the line segments. In some examples, a gap in the line segments corresponds to a real-world gap in the paths of electric grid wires. For example, a gap in an image can correspond to an end of one branch of the electric grid, and a beginning of another branch of the electric grid. In some examples, a gap in the line segments may appear in the raster image data due to errors or incomplete data. For example, a gap in an image can correspond to a real-world electric grid wire that is occluded from overhead view, e.g., by a tree or other obstruction. Some portions of the electric grid wires may be occluded from overhead view, e.g., due to being located inside enclosures or being located underground. Thus, the raster image data can include some gaps that accurately depict gaps in the electric grid, and other gaps in line segments that are inaccurate.

The gap-filling model can process the first raster image data and produce, as output, second raster image data depicting an updated overhead view of the electric grid wires. The updated overhead view of the electric grid wires can include the line segments of the first raster image data as well as additional line segments that fill in gaps in the first raster image data.

The filled-in gaps in the second raster image data represent paths that were gapped in the input data, but that are predicted to be locations of real-world electric grid wires. In some examples, the gap-filling model predicts, for each pixel, a confidence level that the pixel corresponds to a grid wire. The filled-in gaps can include pixels that are predicted to correspond to a grid wire with a confidence level that is greater than a threshold confidence level. The confidence level can be based at least in part on determining likely locations of connections between islanded grid components and non-islanded grid components.

In some examples, the first raster image data can be obtained by converting vector data to raster data. For example, input data representing paths of electric grid wires may be initially obtained in vector data format. To fill in gaps in the vector data, the vector data can first be converted to raster image data. The raster image data can then be processed using the trained gap-filling model, which outputs raster image data with filled-in gaps. The raster image data output from the gap-filling model can then be converted back to vector data format. The output vector data can be incorporated into a virtual model of the electric grid.

In general, innovative aspects of the subject matter described in this specification can be embodied in an electric grid model gap filling method including: obtaining vector data representing first portions of paths of electric grid wires over a geographic region; converting the vector data to first raster image data, the first raster image data depicting an overhead view of the electric grid wires including: a first set of line segments representing the first portions of the paths of the electric grid wires, and gaps between line segments of the first set of line segments; processing the first raster image data using a gap filling model that is configured to fill gaps in raster images depicting overhead views of electric grid wires; obtaining, as output from the gap filling model, second raster image data depicting an updated overhead view of the electric grid wires including: the first set of line segments representing the first portions of the paths of the electric grid wires; and a second set of line segments representing second portions of paths of the electric grid wires, where each line segment of the second set of line segments included in the second raster image data corresponds to one or more of the gaps included in the first raster image data; and converting the second raster image data to vector data representing the first portions and the second portions of paths of the electric grid wires.

In some implementations, obtaining the vector data representing the first portions of paths of electric grid wires over the geographic region includes: obtaining aerial imagery of the geographic region; and analyzing the aerial imagery of the geographic region to identify the electric grid wires in the aerial imagery.

In some implementations, the gap filling model includes a convolutional neural network model.

In some implementations, processing the first raster image data using the gap filling model includes: determining, for each pixel of the first raster image data, a confidence that the pixel represents a location of a grid wire; and assigning a pixel value to each pixel of the second raster image data based on the confidence that a corresponding pixel of the first raster image data represents a location of a grid wire.

In some implementations, the gap filling model has been trained to fill gaps in raster images depicting overhead views of electric grid wires.

In some implementations, the first raster image data includes one or more layers of auxiliary raster image data.

In some implementations, the auxiliary raster image data represents at least one of aerial imagery, property boundaries, transportation routes, or topological features within the geographic region.

In general, other innovative aspects of the subject matter described in this specification can be embodied in an method for training a gap filling model including obtaining a set of images, where each image of the set of images depicts an overhead view of a geographic region and includes a first set of line segments that represent paths of electric grid wires; generating, from the set of images, modified images by creating gaps in the set of images by removing, from each image in the set of images, portions of the first set of line segments that represent the paths of the electric grid wires; processing each of the modified images with a gap filling model to obtain a corresponding output of the gap filling model, the corresponding output of the gap filling model including a second set of line segments corresponding to one or more of the gaps in the modified image; and adjusting parameters of the gap filling model based on the outputs from the gap filling model.

In some implementations, adjusting the parameters of the gap filling model based on the outputs from the gap filling model includes: determining an error by comparing the second set of line segments to the removed portions of the first set of line segments; and adjusting the parameters of the gap filling model based on the determined error.

In some implementations, generating the modified images further includes: adding, to each image in the set of images, one or more layers of auxiliary raster image data.

In some implementations, the auxiliary raster image data represents at least one of aerial imagery, property boundaries, transportation routes, or topological features within the geographic region.

In some implementations, the set of images includes at least one of visible light images, infrared images, hyperspectral images, multispectral images, RADAR images, or LIDAR images.

The subject matter described in this specification can be implemented in various embodiments and may result in one or more of the following technical advantages. The disclosed processes can be used to fill gaps in electric grid models in raster space. Filling gaps in electric grid models in raster space instead of vector space enables modeling systems to take advantage of image processing techniques. For example, raster images can be processed using convolutional neural network models. Thus, filling gaps in raster space instead of vector space can improve efficiency and geographic scaling. For example, image processing techniques can be applied to many raster image tiles, with each raster image tile representing a smaller geographic area within a larger geographic region. In this way, the modeling system can quickly map grid wire paths over the larger geographic region.

Other implementations of the above aspects include corresponding systems, apparatus, and computer programs, configured to perform the actions of the methods, encoded on computer storage devices. The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

Like reference numbers and designations in the various drawings indicate like elements.

DETAILED DESCRIPTION

In general, the present disclosure relates to a system for accurately modeling electric power grids. Specifically, the present disclosure provides a system and method to accurately map paths of electric wires of an electric power grid. The disclosed methods can be used to train a gap-filling model to accurately fill in gaps in overhead images of electric grid wires.

Figure 1:
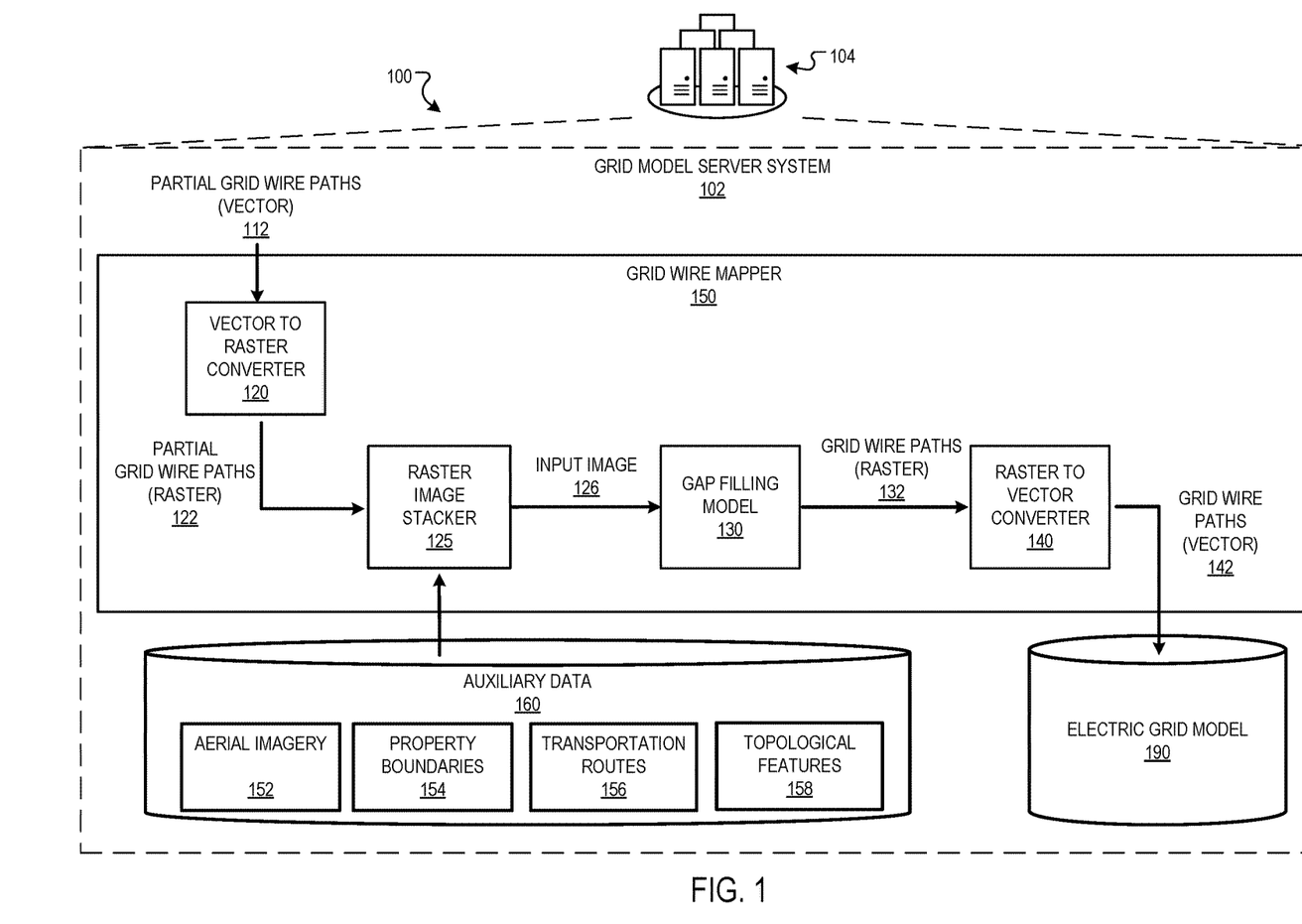
FIG. 1 is a diagram of an example system for electrical power grid modeling.
Figure 3:
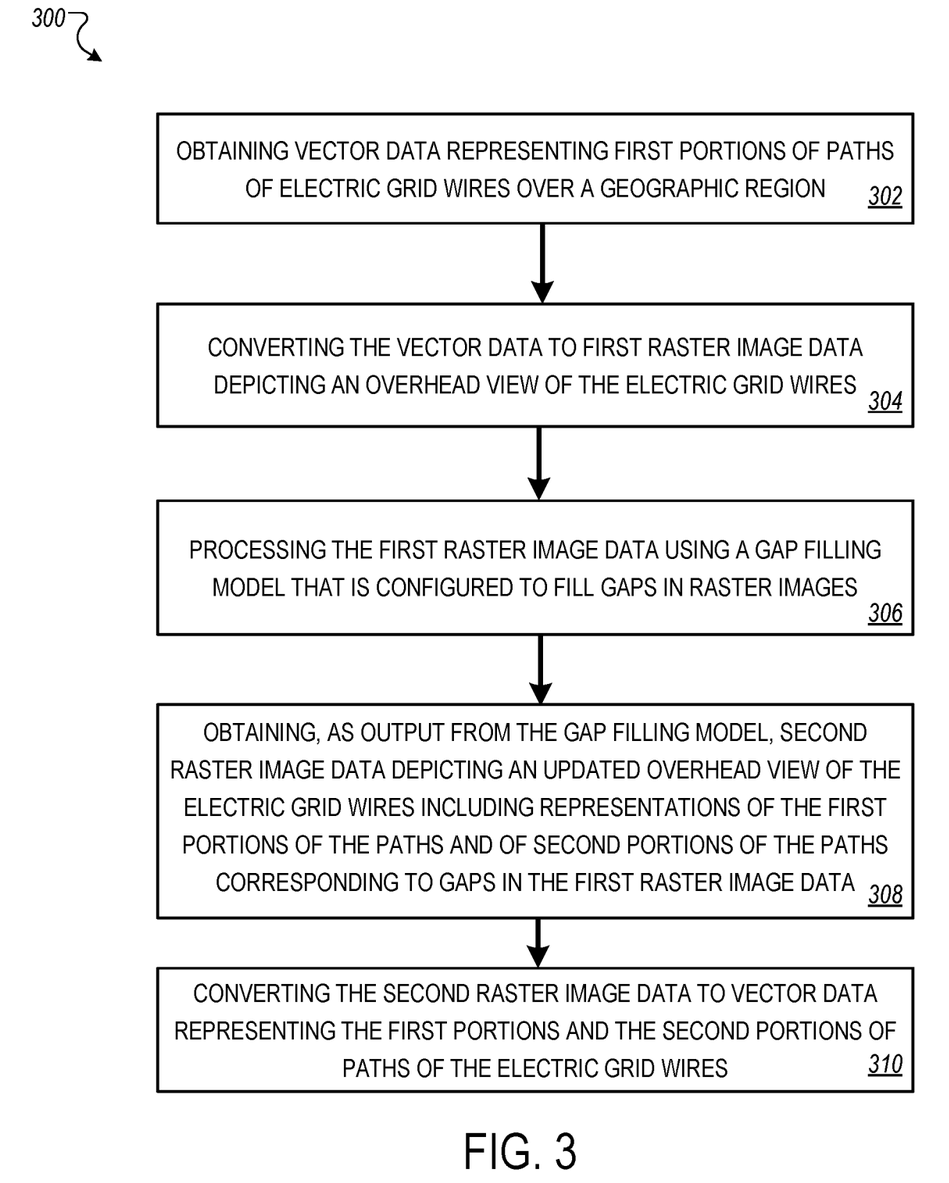
FIG. 3 is a flow diagram of an example process for filling gaps in an electrical power grid model.

FIG. 1 is a diagram of an example system 100 for electrical power grid modeling. The system 100 can be used to perform a process 300 for filling gaps in an electrical power grid model. A flow diagram of the process 300 is illustrated in FIG. 3.

The system 100 includes a grid model server system 102. The server system 102 may be hosted within a data center 104, which can be a distributed computing system having many (e.g., tens, hundreds, or thousands) of computers in one or more locations.

The server system 102 includes a grid wire mapper 150. The grid wire mapper 150 can be provided as one or more computer executable software modules or hardware modules. That is, some or all of the functions of grid wire mapper 150 can be provided as a block of computer code, which upon execution by a processor, causes the processor to perform functions described below. Some or all of the functions of grid wire mapper 150 can be implemented in electronic circuitry, e.g., by individual computer systems (e.g., servers), processors, microcontrollers, a field programmable gate array (FPGA), or an application specific integrated circuit (ASIC).

The server system 102 also includes an electric grid model 190. The electric grid model can include virtual representations of components of an electric grid located within a geographic region. The geographic region can include, for example, an area of hundreds of square meters, several square kilometers, hundreds of square kilometers, or thousands of square kilometers. The geographic region can correspond to a location of an electrical distribution feeder or multiple feeders. In some cases, the geographic region can correspond to a location of a bulk power system within and throughout, e.g., a state, county, province, or country.

The process 300 includes obtaining vector data representing first portions of paths of electric grid wires over a geographic region (302). The first portions of paths of the electric grid wires can be, for example, partial grid wire paths that are visible in overhead images of the geographic region. In some examples, the vector data 112 can be generated through image processing techniques including segmentation processes that are used to identify locations and paths of grid wires.

The partial grid wire paths can be represented by vector data 112. The vector data can define characteristics of the grid wire paths (e.g., position, length, direction) by a list or set of vectors. The vector data can include, for example, coordinate positions corresponding to endpoints of vectors. In some examples, the coordinate positions of vector endpoints can each be defined by a geographic latitude and longitude.

The process 300 includes converting the vector data to first raster image data depicting an overhead view of the electric grid wires (304). For example, a vector to raster converter 120 can receive the partial grid wire paths in a vector format and convert the partial grid wire paths to a raster format 122. The vector to raster converter 120 can generate an image segment, or tile, representing a geographic area. The geographic area can be, for example, a square mile, five square miles, ten acres, etc.

The vector to raster converter 120 can project vector data 112 representing the partial grid wire paths onto the tile. In this way, the vector to raster converter can render the partial grid wire paths as line segments depicted in raster format 122. The raster image data can include line segments that represent paths of the electric grid wires over a geographic region. For example, the raster data can depict the wire paths defined by the vectors as line segments formed by pixels in an array or grid, e.g., as pixels in a bitmap image. In some examples, each pixel of the raster image data is designated as representing a grid wire, or as not representing a grid wire.

In raster format, each pixel of a tile has a pixel value. In some examples, the raster image data can be rendered in high contrast images tiles. Each pixel of a high contrast image tile may have a pixel value of zero or two-hundred fifty five. In some examples, a pixel value of zero can correspond to the color black and indicate the presence of a grid wire at the pixel location. A pixel value of two-hundred fifty-five can correspond to the white and indicate the absence of a grid wire at the pixel location.

In some examples, the raster image data can be rendered in image tiles with a color gradient. Each pixel of a color graded image tile may have a grayscale pixel value of at least zero and at most two-hundred fifty five. In some examples, the raster image data can be rendered in image tiles with color gradients with multiple color channels, e.g., red-green-blue (RGB) color channels.

The partial grid wire paths as rendered in raster format 122 can include gaps between the line segments. In some examples, a gap between line segments may correspond to a real-world gap in the paths of electric grid wires. For example, a gap between line segments in a raster image can correspond to an end of one branch of the electric grid, and a beginning of another branch of the electric grid.

In some examples, a gap between line segments may appear in the raster image data due to errors or incomplete data. For example, a gap in a raster image can correspond to a real-world electric grid wire that is occluded from overhead view, e.g., by a tree or other obstruction. Some portions of the electric grid wires may be occluded from overhead view, e.g., due to being located inside enclosures or being located underground. Thus, the raster image data can include some gaps that accurately depict gaps in the electric grid, and other gaps in line segments that are inaccurate (e.g., due to occlusion of the actual wires in overhead images).

Figure 2A:
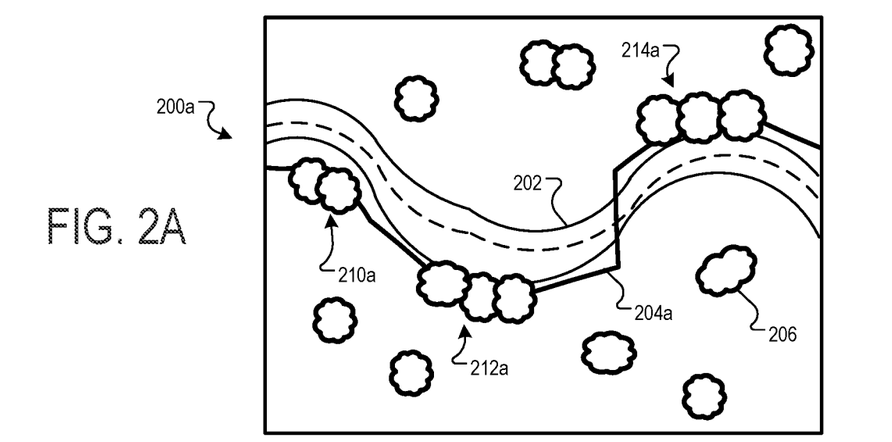
FIG. 2A illustrates an example overhead view of a geographic region that includes electric grid wires.
Figure 2B:
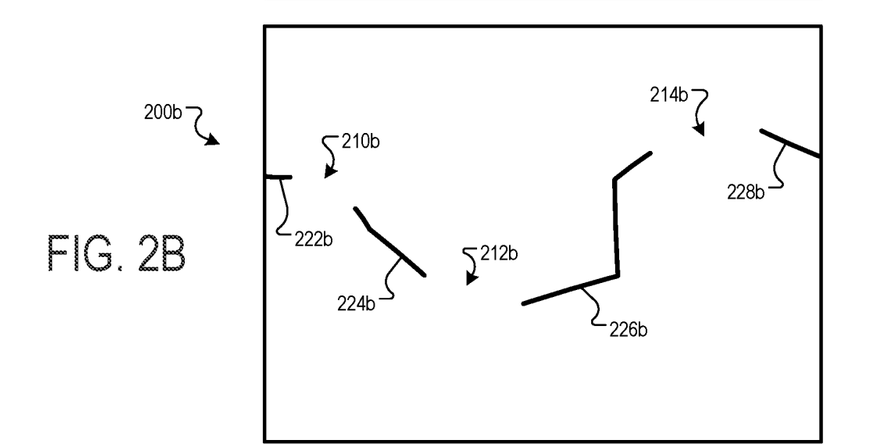
FIG. 2B illustrates an example raster image tile for input to a gap filling model.

FIGS. 2A and 2B illustrate partial electric grid wire paths that are visible from an overhead view of a geographic region. FIG. 2A shows an example overhead view 200a of the geographic region. The overhead view 200a shows several features including a road 202. Electric grid wires 204 are located alongside the road 202. The electric grid wires 204 are represented by a line having multiple segments. The overhead view 200a also includes trees 206. Some of the trees 206 occlude portions of the grid wires 204, including portions 210a, 212a, and 214a of the grid wires 204.

FIG. 2B shows an example raster image tile 200b that corresponds to the geographic region shown in overhead view 200a. The raster image tile 200b includes line segments 204b that represent partial grid wire paths. The partial grid wire paths represented in raster image tile 200b correspond to the portions of the electric grid wires 204 that are visible in the overhead view 200a. The raster image tile 200b is a high contrast image tile. Pixels corresponding to a location of an identified grid wire are represented as black, while pixels that do not correspond to a location of an identified grid wire are represented as white.

The raster image tile 200b includes line segments 222b, 224b, 226b, and 228b corresponding to portions of the grid wires 204a that are visible, e.g., not occluded, in the overhead view 200a. The raster image tile 200b also includes gaps 210b, 212b, and 214b between line segments 222b, 224b, 226b, and 228b. The gaps 210b, 212b, and 214b correspond respectively to the portions 210a, 212a, and 214a of the grid wires 204a that are occluded by the trees 206 in the overhead view 200a.

In some implementations, raster image tiles, e.g., raster image tile 200b, can be combined with auxiliary data 160 to generate an input image 126 that is provided to the gap filling model 130. The auxiliary data 160 can include additional channels of raster data that provide context to inform filling gaps in the electric grid wire paths.

The auxiliary data 160 can include additional raster channels that represent additional features of the geographic region, of the electric grid, or both. The additional raster channels can include, e.g., channels representing aerial imagery 152, property boundaries 154, and transportation routes 156 and topological features 158. The gap filling model can be trained to process input images that include various auxiliary raster channels, so that the gap filling model recognizes patterns and trends in electric grid wire paths. Patterns can include, for example, that electric grid wires tend to follow paths of roads, property boundaries, and topological features such as ridges and valleys. Therefore, including this additional contextual data as input to the gap filling model can improve accuracy in predicting grid wire paths.

The aerial imagery 152 can include imagery collected from overhead sensors. Overhead sensors can include, for example, aerial and satellite sensors. Overhead sensors can include visible light cameras, infrared sensors, RADAR sensors, and LIDAR sensors. The aerial imagery 152 can include visible light data, e.g., red-green-blue (RGB) data, collected by the overhead sensors. The aerial imagery 152 can also include hyperspectral data, multispectral data, infrared data, RADAR data, and LIDAR data collected by the overhead sensors. The aerial imagery 152 can include two-dimensional (2D) data, 2.5D data, or 3D data. The aerial imagery 152 can include multiple channels or layers of imagery data. For example, the aerial imagery 152 can include an RGB layer, a height model layer, a digital surface model layer, and a vegetation index layer.

Property boundaries 154 can include raster image data indicating demarcations between properties, communities, municipalities, towns, counties, etc., within the geographic region. Transportation routes 156 can include raster image data indicating paths of roads, railroads, sidewalks, waterways, etc. Topological features 158 can include raster image data indicating elevations, land forms, etc.

In some examples, auxiliary data 160 can include non-image features. Non-image features can include an identification of the geographic region. The identification of the geographic region can include, for example an identification of a state, province, county, or city. In some examples, the geographic region can include an identification of geographic boundaries of the geographic region, e.g., longitudinal and latitudinal boundaries. In some examples, the auxiliary data 160 can include property boundaries and transportation routes in vector format. In some examples, the auxiliary training data 160 can be represented as continuous valued features, embedded features, or categorical features.

A raster image stacker 125 can receive the partial grid wire paths in raster format 122, and the auxiliary data 160. The raster image stacker 125 can combine, or stack, the partial grid wire paths in raster format 122 with the auxiliary data 160. In some examples, the raster image stacker 125 can select, for stacking, tiles of auxiliary data 160 that align with the raster image tiles that include the partial grid wire paths. For example, a tile of auxiliary raster data may align with a raster image tile if the tiles have the same spatial extent and resolution. The raster image stacker 125 can stack the auxiliary raster data channels and the partial grid wire paths represented in raster format in order to generate an input image 126. The input image 126 can be a raster image including multiple layers of raster data.

The process 300 includes processing the first raster image data using a gap filling model that is configured to fill gaps in raster images depicting overhead views of electric grid wires (306). For example, the gap filling model 130 can be used for inference to fill gaps in incomplete maps of electric grid wires. The trained gap-filling model can receive, as input, raster image data, e.g., input image 126. The input image 126 includes a raster image tile that depicts at least a partial overhead view of electric grid wires stacked with one or more channels of auxiliary raster data.

Figure 2C:
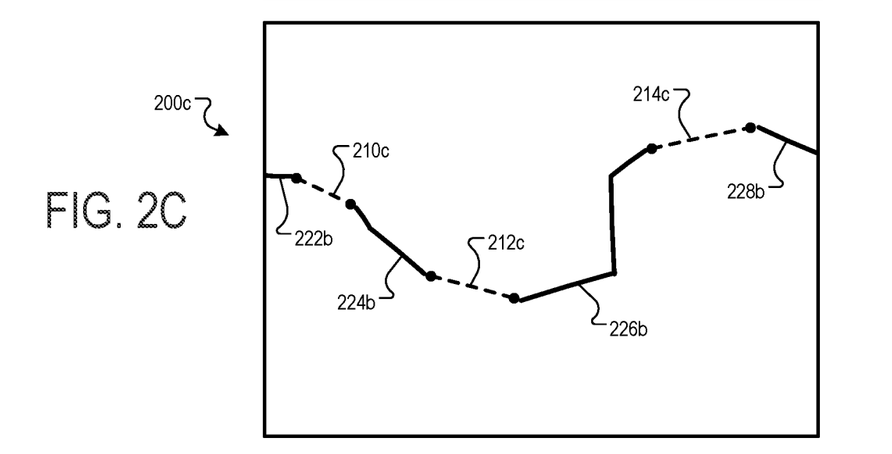
FIG. 2C illustrates an example raster image tile output from a gap filling model.

The gap-filling model can be, for example, a machine learning model such as a convolutional neural network model, e.g., an autoencoder model. The gap filling model 130 can process the first raster image data and produce, as output, second raster image data depicting an updated overhead view of the electric grid wires. For example, the gap filling model 130 can process the input image 126 including raster image tile 200b and produce, as output, raster image tile 200c depicting an updated overhead view of the electric grid wires.

To generate the updated overhead view of the electric grid wires, the gap filling model 130 can determine a confidence value for each pixel of the input raster image. The confidence value can indicate a confidence that the pixel corresponds to a location of a grid wire. The gap filling model can then generate the additional line segments based on the confidence value of the pixels. For example, a pixel having a confidence value greater than a threshold confidence value can be assigned a pixel value of zero, while a pixel having a confidence value less than the threshold confidence value can be assigned a pixel value of two-hundred fifty five.

The gap filling model 130 can be programmed with one or more rules for filling gaps in grid wire paths. An example rule can be that the output grid wire paths 132 cannot include any islanded sections of an electric grid. An islanded section can be defined as a section that is not connected, either directly or indirectly, to a substation of the electric grid. The gap filling model 130 can use confidence values to identify the most likely connection between the islanded section and a non-islanded section that connects to a substation.

For example, the input image 126 may include a section of grid wire paths that appears to be islanded from any substation. The gap filling model can identify potential locations of connections between the islanded grid components and non-islanded grid components. For each potential location, the gap filling model 130 can assign a confidence level indicating the likelihood that the potential location corresponds to a real-world grid wire. The gap filling model 130 can then select the potential location with the highest confidence level. The output grid wire paths 132 therefore will include a line segment connecting the islanded components with non-islanded components at the location with the highest confidence level.

In some examples, the gap filling model 130 can determine the additional line segments using one or more algorithms. For example, the gap filling model 130 can apply algorithms such as Kruskal's algorithm to select estimated lines that connect the fixed line endpoints, subject to distance constraints.

Distance constraints can include, for example, a maximum length of a fixed line between endpoints. Distance constraints can be based on a typical length or a maximum length of a grid wire between utility poles. For example, in a particular region or in a particular electrical grid distribution system, utility poles may be spaced no further apart than a maximum distance, e.g., one hundred feet, two hundred feet, or three hundred feet.

The process 300 includes obtaining, as output from the gap filling model, second raster image data depicting an updated overhead view of the electric grid wires including representations of the first portions of the paths and of second portions of the paths corresponding to gaps in the first raster image data (308). For example, the gap filling model can produce second raster image data depicting grid wire paths 132 in raster format. The output grid wire paths 132 can include the first portions of the paths, e.g., partial grid wire paths in raster format 122, as well as second portions of the paths, e.g., line segments that fill in gaps between the partial grid wire paths. A line segment can fill in a gap, e.g., by connecting a point of a first line segment adjacent to the gap to a point of a second line segment adjacent to the gap.

The filled-in gaps in the second raster image data represent paths that were gapped in the input data, but that are predicted to be locations of real-world electric grid wires. In some examples, the gap filling model 130 predicts, for each pixel, a confidence level that the pixel corresponds to a grid wire. In some examples, a pixel value of zero in the second raster image data can correspond to the color black and indicate high confidence, e.g., 100% confidence, of the presence of a grid wire at the pixel location. A pixel value of two-hundred fifty-five can correspond to the white and indicate low confidence, e.g., 0% confidence, of the presence of a grid wire at the pixel location.

The filled-in gaps in the output grid wire paths 132 can include pixels that are predicted to correspond to a grid wire with a confidence level that is greater than a threshold confidence level. The threshold confidence level can be, for example, 45%, 50%, or 60%. In some examples, pixels that have a confidence level greater than a threshold confidence level for corresponding to a grid wire can be assigned a pixel value of zero, or black. Pixels that have a confidence level lower than a threshold confidence level for representing a grid wire can be assigned a pixel value of two hundred fifty-five, or white.

In some cases, pixel values between zero and two-hundred fifty five can be assigned according to varying confidence levels. For example, a pixel value of one hundred twenty-eight can correspond to the color gray and indicate 50% confidence of the presence of a grid wire at the pixel location. An example pixel with a confidence level of eighty percent for representing a grid wire can be assigned a low pixel value, e.g., corresponding to a dark gray color. Lines of adjacent pixels with high confidence values can be identified by the grid model as likely grid wire paths.

FIG. 2C illustrates an example raster image tile output from a gap filling model. The raster image tile 200*c* includes the line segments 222*b*, 224*b*, 226*b*, and 228*b* as well as additional line segments 210*c*, 212*c*, and 214*c*. The additional line segments 210*c*, 212*c*, and 214*c* are represented in FIG. 2C as dashed lines. The additional line segments 210*c*, 212*c*, and 214*c* fill in the gaps 210*b*, 212*b*, and 214*b* between the partial grid wire paths in the raster image tile 200*b*.

The process 300 includes converting the second raster image data to vector data representing the first portions and the second portions of paths of the electric grid wires (310). For example, the raster to vector converter 140 can receive the output grid wire paths 132 in raster format. The raster to vector converter 140 can map the raster images to a coordinate system, e.g., geographic latitude and longitude coordinates. The raster to vector converter can determine coordinate locations of a starting point and an end point of each line segment in the output raster image. The raster to vector converter can output vector data representing the grid wire paths 142.

The grid wire mapper 150 can output the grid wire paths 142 in vector format to the electric grid model. The vectors can then be added to the electric grid model 190.

The model of the electric grid can include a high resolution model of one or more electrical distribution feeders. The electric grid model 190 can include, for example, data models of substation transformers, medium voltage distribution lines, distribution switches and reclosers, capacitors, voltage regulation schemes, e.g., tapped magnetics or switched capacitors, network transformers, load transformers, inverters, generators, and various loads. The electric grid model 190 can also include transformer locations and capacities, feeder locations and capacities, and load locations.

The grid wire mapper 150 can provide the grid wire paths 142 to the electric grid model 190. The electric grid model 190 can then add a representation of the grid wires to the electric grid model 190. Adding the grid wire paths 142 to the electric grid model 190 can improve accuracy of the electric grid model 190. For example, adding the grid wire paths 142 to the electric grid model 190 can improve accuracy of monitoring and/or simulating electrical power grid operations using the electric grid model 190.

Figure 4:
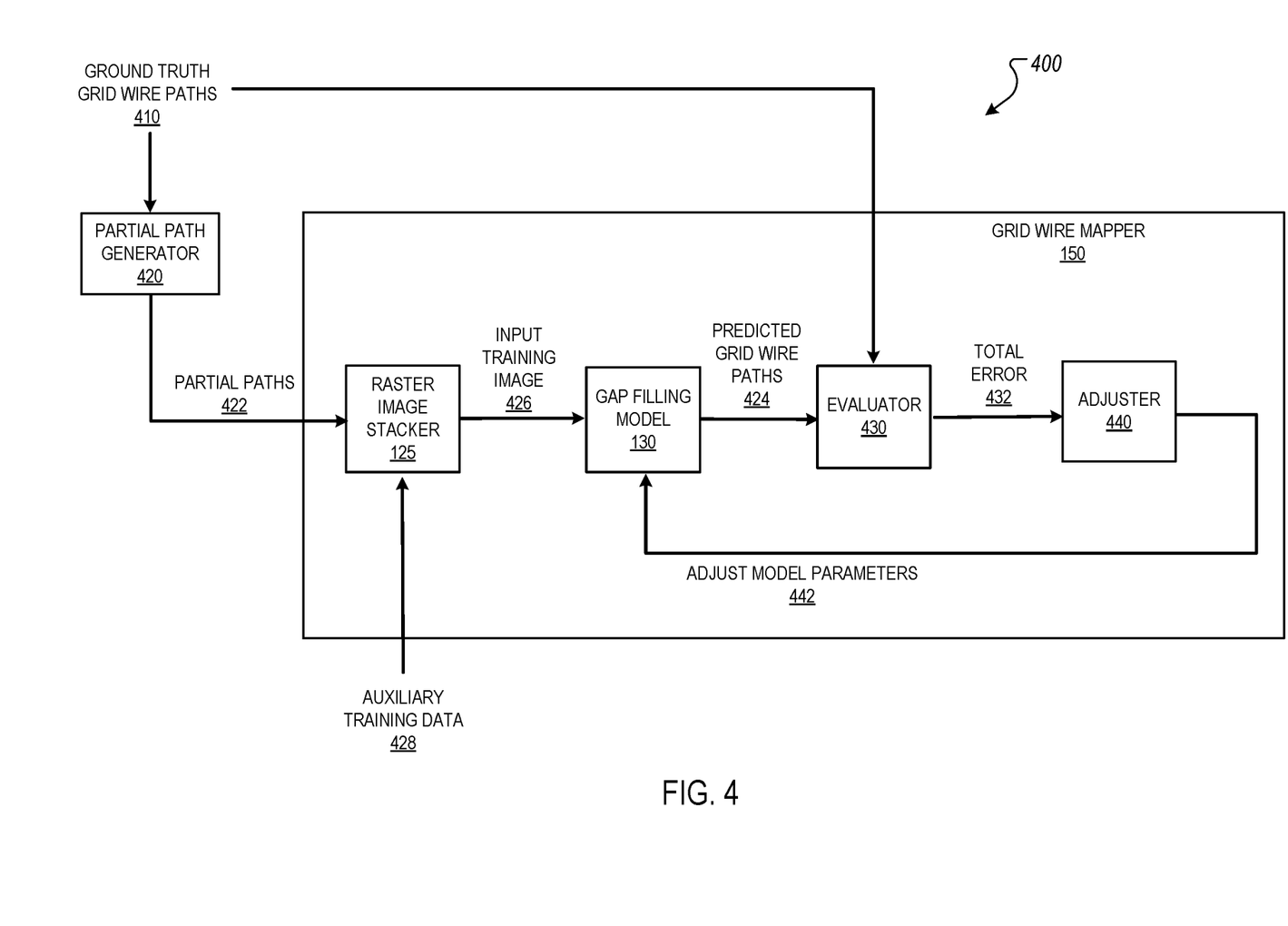
FIG. 4 is a diagram of an example system for training a gap filling model of a power grid modeling system.
Figure 6:
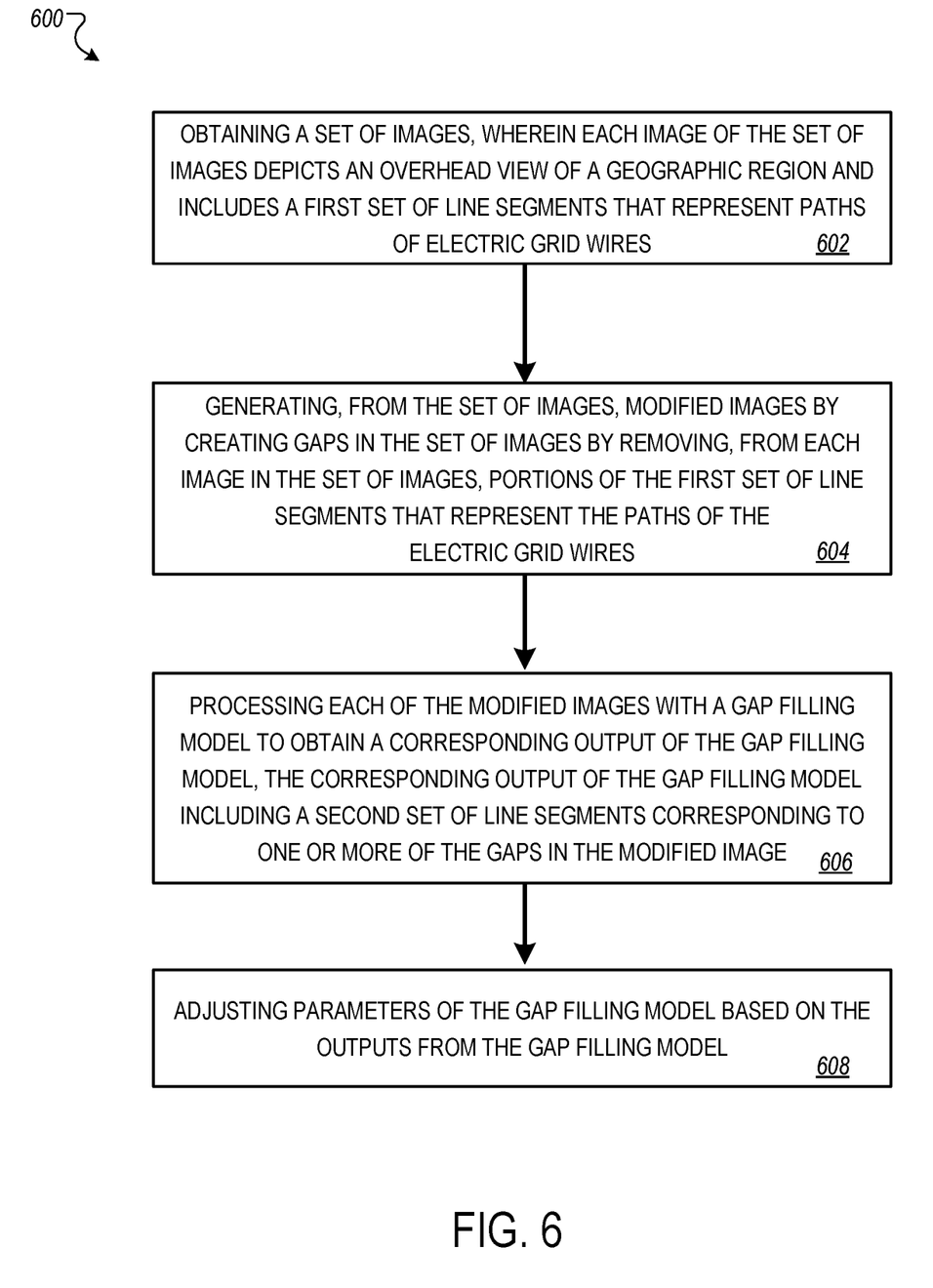
FIG. 6 is a flow diagram of an example process for training a gap filling model.

FIG. 4 is a diagram of an example system 400 for training the gap filling model 130 of the 100 power grid modeling system. The system 400 can be used to perform a process 600 for training the gap filling model 130. A flow diagram of the process 600 is illustrated in FIG. 6.

The system 400 includes a partial path generator 420 and the grid wire mapper 150. The grid wire mapper 150 includes the raster image stacker 125, the gap filling model 130, an evaluator 430, and an adjuster 440. The partial path generator 420, the evaluator 430, and the adjuster 440 can each be provided as one or more computer executable software modules or hardware modules. Some or all of the functions of partial path generator 420, the evaluator 430, and the adjuster 440 can be implemented in electronic circuitry, e.g., by individual computer systems (e.g., servers), processors, microcontrollers, an FPGA, or an ASIC.

The gap filling model 130 can be trained using a supervised training process. The gap filling model 130 can be trained using a set of ground truth images that depict overhead views of electric grid wires. The ground truth images can include line segments that represent paths of electric grid wires over a geographic region. A set of modified images can be generated by removing portions of the line segments from each image in the set of ground truth images. For example, a random selection of between ten and fifty percent of line segments may be removed from the images. Due to removing the portions of the line segments, the modified images include gaps between line segments.

The process 600 includes obtaining a set of images, where each image of the set of images depicts an overhead view of a geographic region and includes a first set of line segments that represent paths of electric grid wires (602). For example, each image of the set of images can include ground truth grid wire paths 410.

Figure 5A:
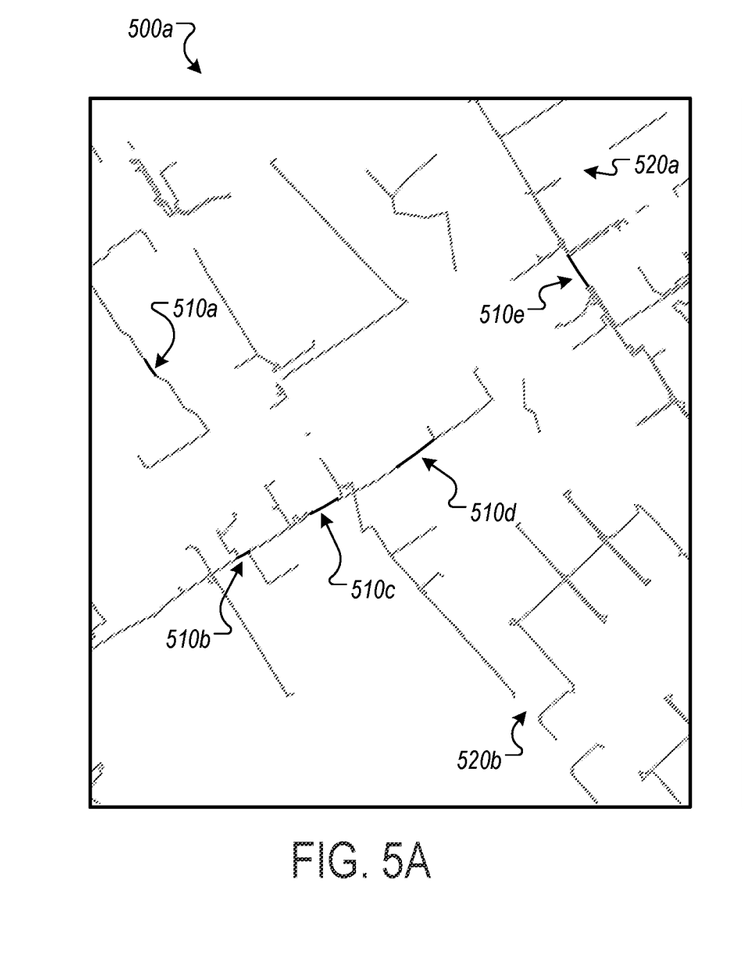
FIG. 5A is an illustration of an example image of ground truth grid wire paths.

FIG. 5A is an illustration of an example image 500*a* of ground truth grid wire paths 410. The ground truth grid wire paths 410 can be, for example, images of line segments representing verified real-world grid wire paths. In some examples, ground truth grid wire paths can be generated from overhead imagery of electric grid wires that is labeled by a human. In some examples, ground truth grid wire paths can be generated from utility or government data sources indicating locations and paths of electric grid wires.

The process 600 includes generating, from the set of images, modified images by creating gaps in the set of images by removing, from each image in the set of images, portions of the first set of line segments that represent the paths of the electric grid wires (604). For example, the ground truth grid wire paths 410 can be provided as input to a partial path generator 420. The partial path generator 420 can generate partial paths 422 from the ground truth grid wire paths 410. The partial paths 422 can include the ground truth grid wire paths 410 with portions removed.

In some examples, the partial path generator 420 can generate the partial paths 422 by removing a percentage of line segments. The partial path generator 420 can be configured to remove, for example, a randomly selected ten percent of line segments, a randomly selected twenty percent of line segments, or a randomly selected thirty percent of line segments.

In the example of FIG. 5A, the partial path generator 420 removes a randomly selected ten percent of line segments. Specifically, the partial path generator 420 removes randomly selected line segments 510a, 510b, 510c, 510d, and 510e.

Figure 5B:
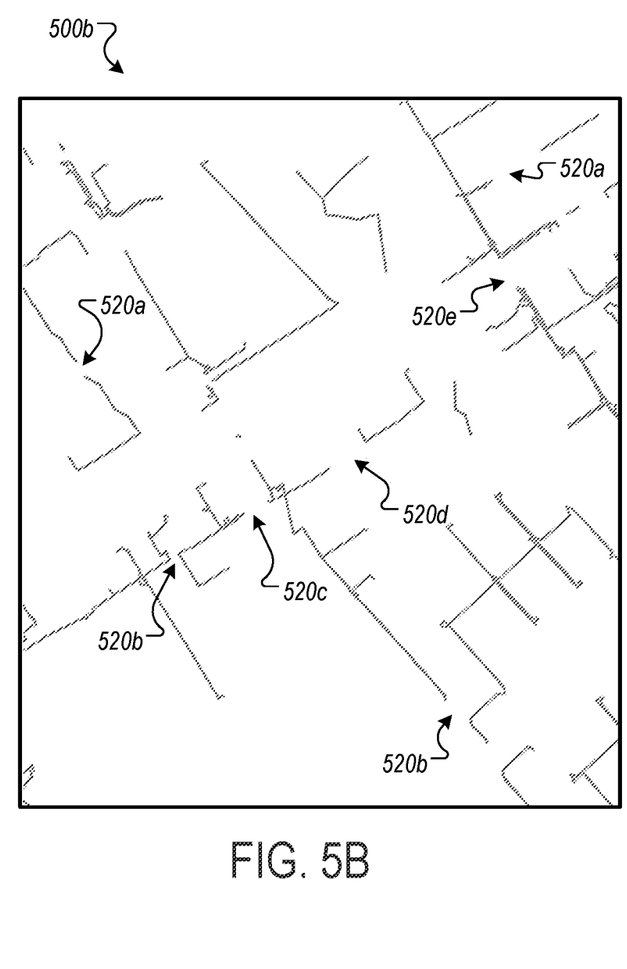
FIG. 5B is an illustration of an example modified image of partial grid wire paths.

FIG. 5B is an illustration of an example modified image 500b of partial paths 422. The partial paths 422 include the ground truth grid wire paths 410 with the random selection of line segments removed. Thus, FIG. 5B includes gaps 520a, 520b, 520c, 520d, and 520e corresponding to the removed line segments 510a, 510b, 510c, 510d, and 510e.

In some examples, auxiliary training data 428, including additional channels of data, can provide additional context that can be used to train the gap filling model 130. Additional channels can represent, e.g., aerial imagery, topological features, property boundaries, transportation routes, etc. of a geographic area. The raster image stacker 125 can combine the auxiliary training data 428 with the modified image including the partial paths 422 to generate an input training image 426.

In some examples, auxiliary training data 428 can include non-image features. Non-image features can include an identification of the geographic region. The identification of the geographic region can include, for example an identification of a state, province, county, or city. In some examples, the geographic region can include an identification of geographic boundaries of the geographic region, e.g., longitudinal and latitudinal boundaries. In some examples, the auxiliary training data 428 can include property boundaries and transportation routes in vector format. The auxiliary training data 428 can be represented, for example, as continuous valued features, embedded features, or categorical features.

The process 600 includes processing each of the modified images with a gap filling model to obtain a corresponding output of the gap filling model, the corresponding output of the gap filling model including a second set of line segments corresponding to one or more of the gaps in the modified image (606). For example, the gap filling model 130 can receive the input training image 426 as input and generate corresponding output images.

The output images can include line segments that fill in gaps that were created by removing the portions of the line segments. The gap-filling model can be, for example, a machine learning model such as an autoencoder model.

The gap filling model 130 can generate output images including predicted grid wire paths 424. The predicted grid wire paths 424 can include line segments that fill in gaps in the partial paths 422. For example, a predicted grid wire path 424 can be a line of adjacent pixels with a high confidence of representing a grid wire. Each pixel of the predicted grid wire path 424 can be assigned a low pixel value, corresponding to a gray or black color.

The output images can also include predicted gaps. For example, the image 500a of ground truth grid wire paths 410 includes gaps 520a and 520b. Gaps 520a and 520b are also present in the image 500b of partial paths 422. The gap filling model 130 may process the modified image 500b and verify that the gaps 520a and 520b have a low confidence of corresponding to a grid wire. Thus, the gap filling model 130 can generate predicted grid wire paths 424 that maintain the gaps 520a and 520b.

The process 600 includes adjusting parameters of the gap filling model based on the outputs from the gap filling model (608). For example, the evaluator 430 can compare the predicted grid wire paths 424 to the ground truth grid wire paths 410. The evaluator 430 can determine a total error 432 between the predicted grid wire paths 424 and the ground truth grid wire paths 410.

The total error 432 between the predicted grid wire paths 424 and the ground truth grid wire paths 410 can include different types of errors. For example, a first type of error can occur when a gap in the input training image 426 corresponds to a gap in the ground truth grid wire paths 410, and the gap filling model 130 fills in the gap. A second type of error can occur when a gap in the input training image 426 corresponds to a grid wire in the ground truth grid wire paths 410, and the gap filling model 130 fails to fill in the gap. A third type of error can occur when a gap in the input training image 426 corresponds to a grid wire in the ground truth grid wire paths 410, and the gap filling model 130 fills in the gap incorrectly. For example, the gap filling model 130 may fill in a gap incorrectly by connecting a first line segment to a second line segment such that the predicted grid wire path 424 that fills in the gap does not match the corresponding ground truth grid wire path 410. In another example, the gap filling may fill in a gap incorrectly by only partially filling in the gap.

Parameters of the gap-filling model can be adjusted based on comparing the output images to the ground truth images. For example, the adjustor 440 can adjust model parameters 442 based on the total error 432. Model parameters can include, for example, configuration variables, neural network weights, support vectors, and coefficients of the model. By adjusting the model parameters based on the total error 432, the gap filling model 130 can be trained to accurately fill in gaps in partial maps of the electric grid.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A method comprising:
   obtaining first vector data identifying geographic coordinates of starting points and end points of first portions of electric grid wires within a geographic region;
   converting the first vector data to first raster image data that depicts an overhead view of the electric grid wires, where converting the first vector data comprises assigning pixel values to an array of pixels based on the first vector data, each pixel in the array of pixels corresponding to a respective geographic location within the geographic region, where the pixel values indicate whether grid wiring is present at the respective geographic location, the first raster image data including:
   a first set of line segments representing the first portions of the electric grid wires included in the first vector data, pixels of the first set of line segments having pixel values indicating presence of the electric grid wires at the respective geographic locations; and
   gaps between line segments of the first set of line segments, pixels of the gaps between the line segments having pixel values indicating absence of electric grid wires at the respective geographic locations;
   processing the first raster image data using a gap filling model that is configured to fill gaps in raster images depicting overhead views of electric grid wires;
   obtaining, as output from the gap filling model, second raster image data that depicts an updated overhead view of the electric grid wires, the second raster image data including an updated array of pixels that represents:
   the first set of line segments representing the first portions of the electric grid wires; and
   a second set of line segments representing second portions of paths of the electric grid wires, wherein each line segment of the second set of line segments corresponds to one or more of the gaps between the line segments of the first set of line segments depicted by the array of pixels of the first raster image data; and
   converting the second raster image data to second vector data identifying geographic coordinates of starting points and end points of the first portions and the second portions of the electric grid wires.

2. The method of claim 1, wherein obtaining the first vector data identifying geographic coordinates of starting points and end points of the first portions of electric grid wires over the geographic region comprises:
   obtaining aerial imagery of the geographic region;
   analyzing the aerial imagery of the geographic region to identify visible electric grid wires in the aerial imagery; and
   generating a set of vectors including, for each vector of the set of vectors, a geographic coordinate of a starting point of the vector and a geographic coordinate of an end point of the vector.

3. The method of claim 1, wherein the gap filling model comprises a convolutional neural network model.

4. The method of claim 1, wherein:
   each pixel of the updated array corresponds to a respective pixel of the array of pixels and to the respective geographic location within the geographic region, and
   processing the first raster image data using the gap filling model comprises, for each pixel of the updated array of pixels:
   determining, a confidence that a grid wire is present at the respective geographic location corresponding to the pixel; and
   assigning a pixel value based on the confidence that the grid wire is present at the respective geographic location corresponding to the pixel, such that pixels of the second set of line segments represented by the updated array of pixels have pixel values indicating predicted connections between the electric grid wires.

5. The method of claim 1, comprising:
obtaining additional raster image data, wherein the additional raster image data depicts an overhead view of at least part of the geographic region, the additional raster image data including an additional array of pixels, wherein each pixel of the additional array of pixels corresponds to a respective pixel in the array of pixels and to the respective geographic location within the geographic region, pixels of the additional array of pixels having pixel values indicating an elevation of the respective geographic location; and
processing the first raster image data and the additional raster image data using the gap filling model to obtain the output from the gap filling model.

6. The method of claim 1, comprising:
obtaining additional raster image data, wherein the additional raster image data depicts an overhead view of at least part of the geographic region, the additional raster image data including an additional array of pixels, wherein each pixel of the additional array of pixels corresponds to a respective pixel in the array of pixels and to the respective geographic location within the geographic region, pixels of the additional array of pixels having pixel values indicating whether a property boundary is present at the respective geographic location; and
processing the first raster image data and the additional raster image data using the gap filling model to obtain the output from the gap filling model.

7. The method of claim 1, comprising:
obtaining additional raster image data, wherein the additional raster image data depicts an overhead view of at least part of the geographic region, the additional raster image data including an additional array of pixels, wherein each pixel of the additional array of pixels corresponds to a respective pixel in the array of pixels and to the respective geographic location within the geographic region, pixels of the additional array of pixels having pixel values indicating whether a roadway is present at the respective geographic location; and
processing the first raster image data and the additional raster image data using the gap filling model to obtain the output from the gap filling model.

8. The method of claim 1, comprising:
obtaining additional raster image data, wherein the additional raster image data depicts an overhead view of at least part of the geographic region, the additional raster image data including an additional array of pixels, wherein each pixel of the additional array of pixels corresponds to a respective pixel in the array of pixels and to the respective geographic location within the geographic region, pixels of the additional array of pixels having pixel values indicating whether a waterway is present at the respective geographic location; and
processing the first raster image data and the additional raster image data using the gap filling model to obtain the output from the gap filling model.

9. A non-transitory computer storage medium encoded with instructions that, when executed by one or more computers, cause the one or more computers to perform operations comprising:
obtaining first vector data identifying geographic coordinates of starting points and end points of first portions of electric grid wires within a geographic region;
converting the first vector data to first raster image data that depicts an overhead view of the electric grid wires, where converting the first vector data comprises assigning pixel values to an array of pixels based on the first vector data, each pixel in the array of pixels corresponding to a respective geographic location within the geographic region, where the pixel values indicate whether grid wiring is present at the respective geographic location, the first raster image data including:
a first set of line segments representing the first portions of the electric grid wires included in the first vector data, pixels of the first set of line segments having pixel values indicating presence of the electric grid wires at the respective geographic locations; and
gaps between line segments of the first set of line segments, pixels of the gaps between the line segments having pixel values indicating absence of electric grid wires at the respective geographic locations;
processing the first raster image data using a gap filling model that is configured to fill gaps in raster images depicting overhead view of electric grid wires;
obtaining, as output from the gap filling model, second raster image data that depicts an updated overhead view of the electric grid wires, the second raster image data including an updated array of pixels that represents:
the first set of line segments representing the first portions of the electric grid wires; and
a second set of line segments representing second portions of the electric grid wires, wherein each line segment of the second set of line segments corresponds to one or more of the gaps between the line segments of the first set of line segments depicted by the array of pixels of the first raster image data; and
converting the second raster image data to second vector data identifying geographic coordinates of starting points and end points of the first portions and the second portions of the electric grid wires.

10. The non-transitory computer storage medium of claim 9, wherein obtaining the first vector data identifying geographic coordinates of starting points and end points of the first portions of electric grid wires over the geographic region comprises:
obtaining aerial imagery of the geographic region;
analyzing the aerial imagery of the geographic region to identify visible electric grid wires in the aerial imagery; and
generating a set of vectors including, for each vector of the set of vectors, a geographic coordinate of a starting point of the vector and a geographic coordinate of an end point of the vector.

11. The non-transitory computer storage medium of claim 9, wherein the gap filling model comprises a convolutional neural network model.

12. The non-transitory computer storage medium of claim 9, wherein:
each pixel of the updated array corresponds to a respective pixel of the array of pixels and to the respective geographic location within the geographic region, and
processing the first raster image data using the gap filling model comprises, for each pixel of the updated array of pixels:
determining a confidence that a grid wire is present at the respective geographic location corresponding to the pixel; and
assigning a pixel value based on the confidence that the grid wire is present at the respective geographic location corresponding to the pixel, such that pixels of the second set of line segments represented by the updated array of pixels have pixel values indicating predicted connections between the electric grid wires.

13. A method comprising:

obtaining a set of images, wherein each image of the set of images depicts an overhead view of a geographic region and includes an array of pixels, wherein each pixel of the array of pixels corresponds to a respective geographic location within the geographic region, where the pixel values indicate whether grid wiring is present at the respective geographic location, the image including a first set of line segments that represent electric grid wires, pixels of the first set of line segments having pixel values indicating presence of the electric grid wires at the respective geographic locations;

generating, from the set of images, modified images, the generating comprising:
creating gaps in the set of images by removing, from each image in the set of images, portions of the first set of line segments that represent the electric grid wires;

processing each of the modified images with a gap filling model to obtain a corresponding output of the gap filling model, the corresponding output of the gap filling model including:
an image depicting an updated overhead view of the geographic region, the image including an updated array of pixels, wherein the updated array of pixels represents a second set of line segments corresponding to one or more of the gaps in the modified image; and adjusting parameters of the gap filling model based on the output of the gap filling model.

14. The method of claim 13, wherein:
each pixel of the updated array corresponds to a respective pixel of the array of pixels and to the respective geographic location within the geographic region,
pixels of the second set of line segments represented by the updated array of pixels have pixel values indicating predicted connections between the electric grid wires, and
adjusting the parameters of the gap filling model based on the output of the gap filling model comprises:
determining an error by comparing the second set of line segments to the removed portions of the first set of line segments; and
adjusting the parameters of the gap filling model based on the determined error.

15. The method of claim 13, wherein the set of images comprises at least one of visible light images, infrared images, hyperspectral images, multispectral images, RADAR images, or LIDAR images.

16. The method of claim 13, wherein the gap filling model comprises a convolutional neural network model.

17. The method of claim 13, comprising:
obtaining additional image data, wherein the additional image data depicts an overhead view of at least part of the geographic region, the additional image data including an additional array of pixels, wherein each pixel of the additional array of pixels corresponds to a respective pixel in the array of pixels and to the respective geographic location within the geographic region, pixels of the additional array of pixels having pixel values indicating an elevation of the respective geographic location; and
processing each of the modified images and the additional image data using the gap filling model to obtain the corresponding output from the gap filling model.

18. The method of claim 13, comprising:
obtaining additional image data, wherein the additional image data depicts an overhead view of at least part of the geographic region, the additional image data including an additional array of pixels, wherein each pixel of the additional array of pixels corresponds to a respective pixel in the array of pixels and to the respective geographic location within the geographic region, pixels of the additional array of pixels having pixel values indicating whether a property boundary is present at the respective geographic location; and
processing each of the modified images and the additional image data using the gap filling model to obtain the corresponding output from the gap filling model.

19. The method of claim 13, comprising:
obtaining additional image data, wherein the additional image data depicts an overhead view of at least part of the geographic region, the additional image data including an additional array of pixels, wherein each pixel of the additional array of pixels corresponds to a respective pixel in the array of pixels and to the respective geographic location within the geographic region, pixels of the additional array of pixels having pixel values indicating whether a roadway is present at the respective geographic location; and
processing each of the modified images and the additional image data using the gap filling model to obtain the corresponding output from the gap filling model.

20. The method of claim 13, comprising:
obtaining additional image data, wherein the additional image data depicts an overhead view of at least part of the geographic region, the additional image data including an additional array of pixels, wherein each pixel of the additional array of pixels corresponds to a respective pixel in the array of pixels and to the respective geographic location within the geographic region, pixels of the additional array of pixels having pixel values indicating whether a waterway is present at the respective geographic location; and
processing each of the modified images and the additional image data using the gap filling model to obtain the corresponding output from the gap filling model.

* * * * *